US005740198A

United States Patent [19]

Ham

[11] Patent Number: 5,740,198

[45] Date of Patent: Apr. 14, 1998

[54] APPARATUS FOR INCREASING SCSI BUS LENGTH THROUGH SPECIAL TRANSMISSION OF ONLY TWO BUS SIGNALS

[75] Inventor: William E. Ham, Andover, Mass.

[73] Assignee: Digital Equipment Corporation, Maynard, Mass.

[21] Appl. No.: 262,083

[22] Filed: Jun. 17, 1994

[51] Int. Cl.$^6$ .............................. H04B 3/00; H01B 11/18

[52] U.S. Cl. .............................. 375/257; 333/33; 174/28; 174/34; 174/113 R

[58] Field of Search .................................... 375/220, 287, 375/288, 257, 377; 333/32–33; 174/28–29, 34, 36, 113 AS, 113 R, 115

[56] References Cited

U.S. PATENT DOCUMENTS

| | | | |
|---|---|---|---|
| 2,157,475 | 5/1939 | Braun | 174/29 |
| 2,348,752 | 5/1944 | Quayle | 174/29 |
| 3,273,080 | 9/1966 | Hildebrand . | |
| 3,489,844 | 1/1970 | Motley | 174/32 |
| 4,376,920 | 3/1983 | Smith | 333/12 |
| 4,627,076 | 12/1986 | Staal et al. | 375/257 |
| 4,755,629 | 7/1988 | Beggs et al. | 174/34 |
| 4,866,212 | 9/1989 | Ingram | 174/28 |
| 4,873,393 | 10/1989 | Friesen et al. | 174/34 |
| 4,998,079 | 3/1991 | Theall, Jr. | 333/112 |
| 5,053,583 | 10/1991 | Miller et al. | 174/36 |
| 5,220,130 | 6/1993 | Walters | 174/36 |
| 5,239,559 | 8/1993 | Brach et al. | 375/257 |
| 5,245,134 | 9/1993 | Vana, Jr. et al. | 174/117 F |
| 5,283,390 | 2/1994 | Hubis et al. | 174/36 |
| 5,286,923 | 2/1994 | Prudhon et al. | 174/113 R |
| 5,313,595 | 5/1994 | Lewis et al. | 395/306 |
| 5,341,400 | 8/1994 | Davis | 375/256 |

FOREIGN PATENT DOCUMENTS

| | | | |
|---|---|---|---|
| 0 227 268 | 1/1987 | European Pat. Off. . | |
| 1108919 | 4/1968 | United Kingdom | 174/113 R |

OTHER PUBLICATIONS

Kurt Chan, "Single–Ended SCSI Parameters and Signal Quality" Hewlet–Packard Reprinted Apr. 1994, Originally Published Aug. 1990.

*Primary Examiner*—Young T. Tse
*Attorney, Agent, or Firm*—Mary M. Steubing

[57] ABSTRACT

A cable used for transmitting the signals of a communications bus, such as a SCSI bus, having arbitration control signals subject to a wired-or glitch—such as the SCSI BSY signal. Low characteristic impedence conductors ensure that voltage reflections resulting from the deassertion of the BSY signal do not exceed a minimum threshold signal assertion voltage, allowing an increase in the maximum length of the SCSI bus cable.

8 Claims, 4 Drawing Sheets

APPARATUS FOR INCREASING SCSI BUS LENGTH THROUGH SPECIAL TRANSMISSION OF ONLY TWO BUS SIGNALS

BACKGROUND OF THE INVENTION

The invention relates to communications busses of the type used to connect a digital computer to peripheral devices, and more particularly methods for increasing bus lengths.

A known type of communications bus is the SCSI bus, which obtains its name by complying with the Small Computer System interface ("SCSI") standards of the American National Standards Institute, New York, New York, USA, the latest version of which is designated ANSI X3T9.2/375R Rev. 10 k.

Generally speaking, the SCSI standards specify the electrical, mechanical and logical characteristics of the SCSI bus, which is an eight or sixteen bit (or thirty two bit in an extended configuration) parallel input/output (I/O) bus. Up to a total of sixteen devices (including the computers) can be connected to the bus. The peripheral devices can include, for example, disk drives, tape drives, printers, compact disk read-only memories ("CD-ROM's"), and scanners.

The SCSI standards specify a distributive bus protocol, which facilitates information transfers between devices connected to the bus. Generally speaking, the bus protocol refers to the host computers on the bus as "initiators" and the peripheral devices on the bus as "targets". The initiators are capable of initiating operations on the bus, and the targets are capable of responding to the initiators to perform operations. The SCSI standards also specify an arbitration system, under which control of the bus is awarded to the device on the bus having the highest priority level of those contending for control.

The bus protocol includes an addressing scheme for identifying the initiators and targets, and specifies control signals used to control operation of the SCSI bus, and to establish communication links between the initiators and targets for information transfers on the bus.

The control signals are asserted over specified "lines" of the SCSI bus, and include, among others, the following:

1) BUSY or "BSY" (which, when asserted, indicates that the bus is in use, i.e., busy or not "free")
2) REQUEST or "REQ" (which is used by a target to indicate a request for a data information transfer between the initiator and the target, i.e., when asserted by a target, the initiator is to accept data from the bus during an information-in-phase, or place data on the bus during an information-out-phase),
3) ACKNOWLEDGE or "ACK" (which, when asserted, indicates that data information sent over the bus is valid, i.e., when asserted, the initiator has placed data information on the bus during an information-out-phase, or has accepted data from the bus during an information- in-phase).

In addition to the control lines, the initiators and targets use a bi-directional parallel DATA bus (i.e., DATA lines of the SCSI bus) to transfer data information. The DATA lines are also used to transfer SCSI ID codes that uniquely identify the devices on the SCSI bus, and specify their relative priority during arbitration.

A well known problem with the SCSI bus definition is its limitation on cable lengths. SCSI busses can be either "differential" or "single-ended". A single-ended configuration, in which the voltage on a single conductor determines the assertion or de-assertion of the signal, uses a cable limited to six meters in length for each signal line. A differential configuration, wherein the voltage difference between two conductors (referenced to ground) determines the assertion or deassertion of a signal, uses cables limited to 25 meters in length for each signal line.

It has been discovered that the cable length limitation is due to a problem to which the SCSI protocol is subject, known as "wired-or glitch." This problem will be discussed in the context of the BUSY line, thus the name "BUSY glitch."

To understand the "BUSY glitch", it is necessary to consider normal operation of the SCSI bus, when, for example, two or more devices attempt to gain access to the SCSI bus at the same time by arbitrating for its control. The devices do so by asserting the BUSY line of the bus. In accordance with the SCSI standards, which specify negative logic, the contending devices drive the BUSY line of a single-ended bus to a low voltage state ("LOW"), and assert selected other lines indicating the respective priority levels.

Since only one device can gain control of the SCSI bus at a time, the devices "losing" the arbitration will deassert the BUSY line, and thus drop off the bus. When they deassert the BUSY line, a current differential arises, which results in a voltage wavefront traveling the length of the line. When the wavefront reaches the other end, it is reflected back. This wavefront is called a BUSY glitch.

The wavefront is essentially a voltage pulse or "step". The voltage step can be of sufficient magnitude to cause a false high voltage state ("HIGH") on the BUSY line, i.e., using the negative logic of the SCSI standards, the line will falsely appear to be deasserted at any point along the line until the reflection reaches that point. The false or invalid deassertion of the BUSY signal can "fool" other devices on the bus into "believing" that the bus is free when it is not, thereby adversely affecting bus operation.

In order to avoid the adverse effects of the BUSY glitch, the SCSI standards contemplate that the devices on the SCSI bus should wait before they again seek control of the SCSI bus for a length of time after first detecting a BUSY glitch equal to that required for the waveform to make a round trip on the bus, which depends on the length of the bus. The specification refers to this length of time as the bus "settle time". The specification therefore limits the length of the bus cable to guarantee that a wired-or glitch will traverse twice the length of the cable within the "settle time" specified, assuming that signals propagate through the signal carriers in a cable at a typical speed of 1.6 ns/ft.

The SCSI bus was initially meant for coupling physically small computers with each other and with peripheral devices. The SCSI bus definition has since evolved into a higher performance interconnect, and is now being used in midrange computer applications supporting the interconnection of numerous devices. In such applications it is often desirable to interconnect computers and devices that are at significant distances from one another—potentially, in separate rooms. It is highly disadvantageous, however, to add the cost of expensive bus adapters to these systems in order to achieve the longer bus lengths necessary. The SCSI cable length limitation has thus become increasingly onerous.

SUMMARY OF THE INVENTION

It is desirable to provide longer cable lengths for SCSI bus applications, while maintaining adherence with all the other requirements of the SCSI specification.

According to the principles of the invention there is provided a cable for transmitting communications bus signals, the bus including arbitration control signals subject to a wired-or glitch. The cable includes conductors for transmitting the signals subject to the wired-or glitch. The conductors having a sufficiently low characteristic impedance to ensure that voltage reflections resulting from a signal deassertion on the conductor do not exceed a minimum threshold signal assertion voltage. More particularly, a medium surrounds each conductor, the medium having a sufficiently high effective dielectric constant to provide a characteristic impedance of the conductor which ensures that voltage reflections resulting from the deassertion of a signal subject to the wired-or glitch do not exceed the minimum threshold signal assertion voltage.

The BSY glitch is thereby undetectable by the SCSI bus receivers. The bus "settle time" specification can thus be ignored, resulting in a doubling of the maximum length of the SCSI cable.

These novel concepts are applied to provide increased length SCSI cables for use in any SCSI system, allowing greater bus length without the use of expensive bus adapters. These low cost and highly efficient solutions provide a much needed increase in maximum SCSI bus cable length. Furthermore, the novel concepts can be applied to increase the length of any communications bus which is limited in length due to wired-or glitch problems on control signals.

DETAILED DESCRIPTION OF THE PREFERRED EMBODIMENT

Figure 1:
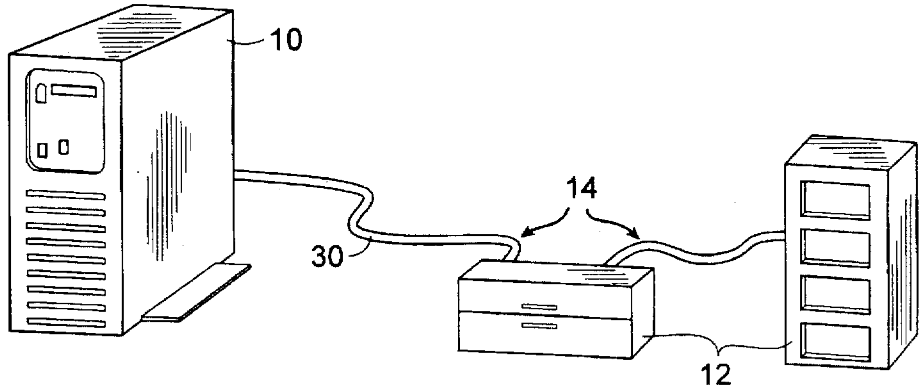
FIG. 1 is a block diagram of a computer system showing a CPU connected to peripheral devices via a SCSI bus cable incorporating bus signal conductors according to the principles of the invention.

Referring now to FIG. 1, there is shown a computer system including a computer 10 and I/O devices 12, which are for example disk drives, all interconnected by a communications bus 14 which is for purposes of description a SCSI bus, though the invention is not so limited. The SCSI bus 14 shown is of a differential configuration, wherein the voltage difference between two conductors (referenced to ground) determines the assertion or deassertion of a signal. It is understood that the SCSI bus 14 can also be of a single ended configuration, in which the voltage on a single conductor relative to ground determines the assertion or deassertion of the signal. The signals of the SCSI bus 14 are transmitted by a SCSI bus cable 30.

Figure 8:
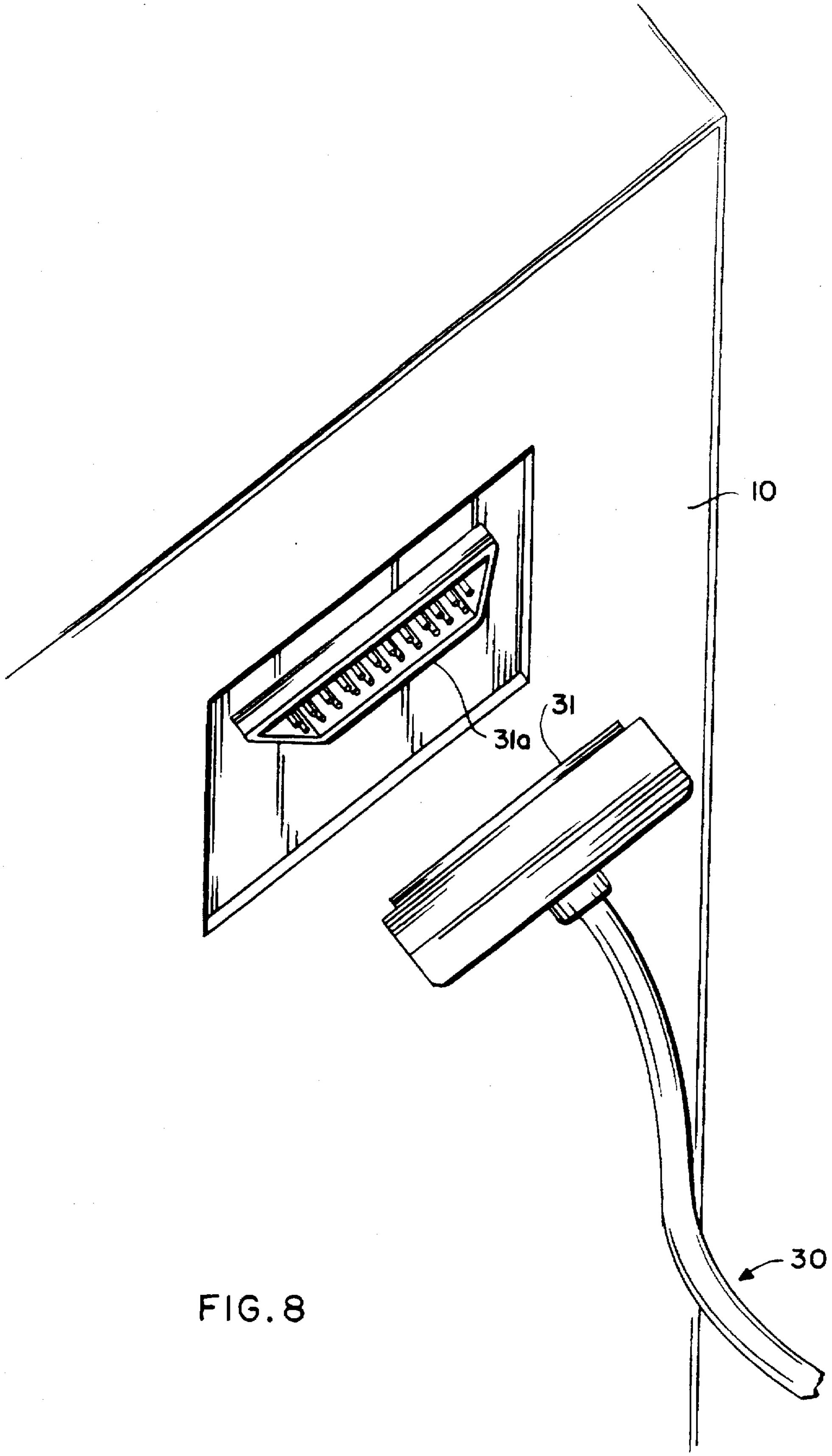
FIG. 8 is a representation of the SCSI bus cable connection to the CPU of FIG. 1 showing the cable connector and mating device connector.

Referring now to FIGS. 1 and 8, the SCSI bus cable 30 is connected to the computer 10 by a standard electrical SCSI connector 31 located at one end of the cable 30. The SCSI connector 31 interfaces with a mating SCSI connector 31*a* on the computer 10. The SCSI connector 31 and mating SCSI connector 31*a* can be implemented as any of a number of industry standard SCSI connectors well known in the art. The SCSI bus cable 30 is connected in a similar manner to I/O devices 12.

Figure 2:
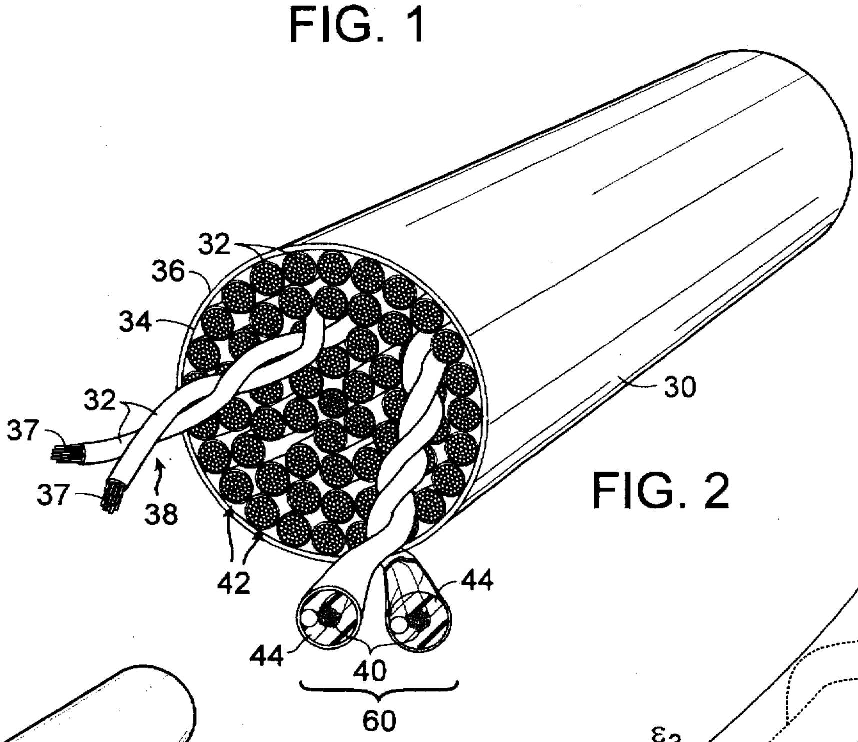
FIG. 2 is a cutaway view of the cable used to connect the bus signals amongst the devices of FIG. 1.

Referring now to FIG. 2, there is shown a cutaway view of the SCSI bus cable 30 of FIG. 1. Multiple conductors 32 are bunched together and wrapped by a shield 34 disposed within a jacket 36. Each conductor 32 is shown to include multiple strands of conducting wire 37; however, it is understood that a single solid conductor could also be used. For reasons of convenience, not all of the 25 conductors 32 necessary to propagate all the SCSI signals are shown.

The conductors 32 are coupled to the connectors 31 located at each end of the cable 30 in any of the manners well known in the art.

A pair of conductors 38 is used to propagate each signal. For the differential bus configuration, the voltage difference between the two conductors associated with a bus signal determines the assertion or deassertion of the signal. For the single-ended configuration, a signal-carrying conductor 32 is paired with a ground conductor 32 for each bus signal. In either case, the two conductors are twisted about each other for noise reduction reasons as is known in the art.

When devices wish to gain control of the SCSI bus, they must check to see if the bus is busy. The bus signal BSY when asserted indicates that the bus is currently controlled by another device; thus, the device wishing to gain control must wait until the BSY signal is deasserted, indicating that the bus is free. All devices connected to the SCSI bus are capable of driving the BSY signal; that is, the BSY signal is wired-or connection between the devices. The BSY signal is therefore subject to the previously described wired-or glitch problem. When several devices are asserting the BSY line and then one device deasserts the BSY line, a reflection travels the length of the SCSI cable, causing a temporary false deassertion signal level that can falsely indicate to other devices that the bus is free. To avoid this problem, the industry standard SCSI specification calls for adherence to a bus "settle time" parameter. Each requesting device must wait for this "settle time" after sensing a deassertion of the BSY line to ensure that the deassertion is not actually a reflection. The bus "settle time" parameter is based on some multiple of the round-trip propagation time of a reflection on the BSY line—which is in turn based on the typical propagation speed of the signal and on the length of the cable. That is, the round trip propagation time is equal to the length of the cable divided by the speed at which the BSY reflection propagates down its particular conductor. It thus becomes apparent that cable length can be increased over that specified by a number of methods affecting the propagation of BSY reflections.

First of all, if the speed at which the BSY reflection propagates on its conductor is increased, the length of the cable can be proportionately increased while still guaranteeing that any reflections will complete a round trip propagation (or multiple round-trip propagations in the event that secondary reflections can exceed a certain voltage threshold) within the specified "settle time". That is if $T_{rt}$ represents round-trip propagation time, 1 represents the specified length of the cable, and $V_{prop}$ represents the typical propagation speed of a signal per unit length of cable, then $$T_{rt}=2*1/V_{prop}=2*1*n/V_{prop}*n.$$

Therefore, one way of increasing SCSI cable length is to provide a cable having conductors capable of transmitting the signals subject to the wired-or glitch at a greater propagation speed than that provided through the conductors of a typical cable. Thus, according to the principles of the invention, a cable is provided including first conductors 40 for transmitting the BSY signal which is subject to the wired-or glitch at a first propagation speed, and including second conductors 42 for transmitting the other bus signals at a second typical propagation speed, where the first propagation speed is greater than the second propagation speed. One way of so doing is to construct a cable 30 wherein the second conductors 42 are of the typical variety propagating signals at approximately 1.6 ns/ft, but wherein the first conductors 40 are specially constructed so as to propagate the BSY signal faster that 1.6 ns/ft.

One way of increasing the propagation speed of the wired-or BSY signal is by surrounding the BSY signal conductors 40 with a dielectric medium 44 having a relatively low dielectric constant. The dielectric constant $\epsilon_r$ of a material is a dimensionless quantity which when multiplied by the permittivity of free space, designated $\epsilon_0$ and measuring $8.854\times10^{-12}$ F/m, gives the absolute permittivity of the material measured in units of capacitance per unit length. It is known that the propagation speed of a signal through a conductor increases in proportion with the square root of the decrease in the permittivity of the material surrounding the conductor. Thus, a conductor spaced from the surrounding conductors of a cable by a medium having a low dielectric constant will propagate a signal faster than typical conductors within a cable, which are more closely surrounded by other conductors.

Figure 3:
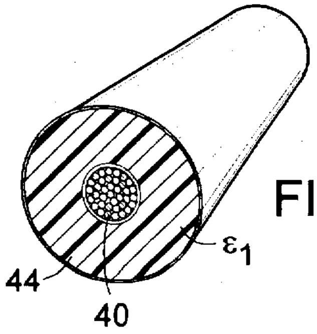
FIG. 3 is a cross-sectional view of a high propagation speed conductor within the cable of FIG. 2.

Referring to FIG. 3 there is shown the ideal case, where the conductor 40 is surrounded by air having a relative dielectric constant $\epsilon_1$, which provides the lowest dielectric constant at approximately unity, and thus the most substantial propagation speed increase. Though it is not feasible to suspend the conductor 40 in air, other options can be pursued to provided a dielectric medium 44 with an "effective" dielectric constant $\epsilon_f$ close to that of air.

First of all, the medium 44 could be constructed entirely of some other material having a relatively low dielectric constant. Feasible materials include Teflon, having a dielectric constant of approximately 2.1, and polyethylene, which has a dielectric constant of approximately 2.3. A signal traveling through a conductor 40 surrounded by a medium 44 with a dielectric constant of approximately 2 will travel at approximately 0.7 times the speed at which it would travel through the same conductor 40 were the medium 44 air.

Figure 4:
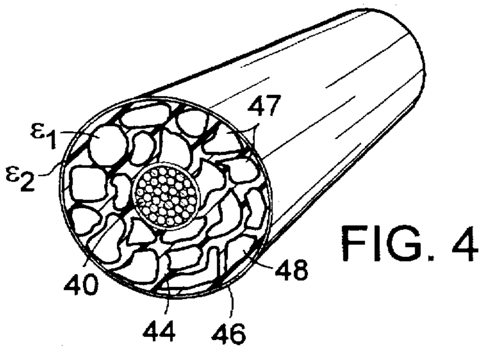
FIG. 4 is a cross-sectional view of an alternate embodiment of the high propagation speed conductor.

Secondly, referring to FIG. 4, the dielectric medium 44 could be constructed of an air-filled foam material such as foam teflon. The medium 44 would then have an "effective" dielectric constant $\epsilon_f$ dependent upon the volume distribution of materials making up the medium 44. For instance, as shown in the Figure, the medium 44 includes a cellular distribution of teflon 46 having a dielectric constant $\epsilon_2$, the cells 47 being filled with air 48 having a dielectric constant $\epsilon_1$. The "effective" dielectric constant $\epsilon_f$ is then approximately $$\epsilon_f=\epsilon_1(V1/(V1+V2))+\epsilon_2(V2/(V1+V2)),$$

where V1 is the volume of air 48 surrounding the conductor 40 while V2 is the volume of teflon 46 surrounding the conductor 40. Clearly, larger celled foams will provide the larger propagation speed increases.

Figure 5:
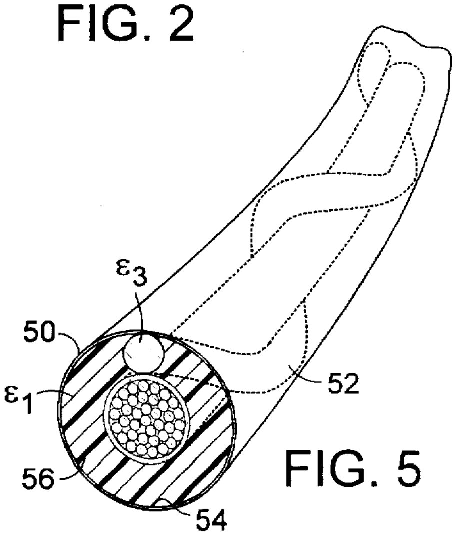
FIG. 5 is a cross-sectional view of another embodiment of the high propagation speed conductor.

A third way of providing a dielectric medium 44 having a sufficiently low effective dielectric constant is shown in FIG. 5. According to this construction, the BSY signal conductors 40 are disposed within a tubular insulating core 50. An insulating filament 52 is helically wrapped about the length of the conductor 40 to provide a space between the conductor 40 and the interior wall 54 of the core 50. There is thus provided an air gap or space 56 between the conductor 40 and the interior wall 54 of the core 50.

According to this implementation, an effective dielectric constant $\epsilon_f$ surrounds the conductor 40, the effective dielectric constant $\epsilon_f$ again being dependent upon the volume distribution of materials making up the medium 44. Thus, if the insulating filament 52 having a dielectric constant $\epsilon_3$ occupies an area A1 per unit length of the conductor, and air having the dielectric constant $\epsilon_1$ occupies the remaining area A2 per unit length of the conductor within the insulating core, the effective dielectric constant is $$\epsilon_f=\epsilon_1(A2/(A1+A2))+\epsilon_3(A1/(A1+A2)).$$

For example, it has been found that a 26 AWG (7/34) silver plated copper conductor, when helically wrapped with an FEP filament of a 0.010 inch diameter and disposed within an FEP tubular core of a 0.043 inch diameter, will provide a propagation delay of 1.14±0.03 ns/ft; thus providing about a 30% increase in speed over the conventional conductor propagation delay of 1.6 ns/ft.

Though the space 56 is maintained In FIG. 5 by use of the filament 52 helically wrapped about the conductor 40, many ways of maintaining the space 56 can be implemented within the principles of the invention. For example, strips of insulating material might be circularly wrapped about the conductor 40 at intervals along the length of the conductor 40.

In general, any of the previously described ways of surrounding a conductor 40 with a dielectric medium 44 to increase the propagation speed of a signal through the conductor 40 can be applied to each of the conductors 40 of the BSY signal conductor pair 60 to increase the propagation speed of the BSY signal. Any wired-or glitch will thereby propagate faster, thus allowing a proportional increase in the length of the cable 30 without violating the bus settle time specification. According to the most recent SCSI bus specifications, the SEL signal is also wired-or between the devices 12 connected to the bus 14; therefore, higher propagation speed conductors 40 should comprise the SEL signal conductor pair 60 as well in order to increase the length of the bus.

The other SCSI bus signals can be transmitted by way of typical conductor pairs 38. Alternatively, all the SCSI bus signals can be transmitted via the high propagation speed conductors 40. The other SCSI bus signals, such as the DATA signals, cannot, however, be propagated via a mixture of high propagation speed conductors 40 and typical propagation speed conductors 42 without violating the SCSI signal skew specification for those signals.

Longer SCSI bus lengths are thereby provided by a SCSI cable 30 that interfaces to devices such as the computer 10 or I/O devices 12 via industry standard SCSI connectors 31 in the same standard manner as any presently available SCSI cable.

A second way of increasing the length of the SCSI bus cable 30 arises from the realization that adherence to the SCSI cable length specification is in fact necessary only for those signals subject to the wired-or glitch problem; i.e. the BSY signal. Thus, if the length of the conductive path transmitting the BSY signal is within the cable length specification, then the conductive paths for transmitting the other SCSI signals can exceed the cable length specification. Thus, referring to FIG. 6, first conductive paths 62 can be provided for transmitting the signals subject to a wired-or glitch, and second conductive paths 64 can be provided for transmitting the other bus signals, the first conductive paths 62 being shorter than the second conductive paths 64.

Figure 6:
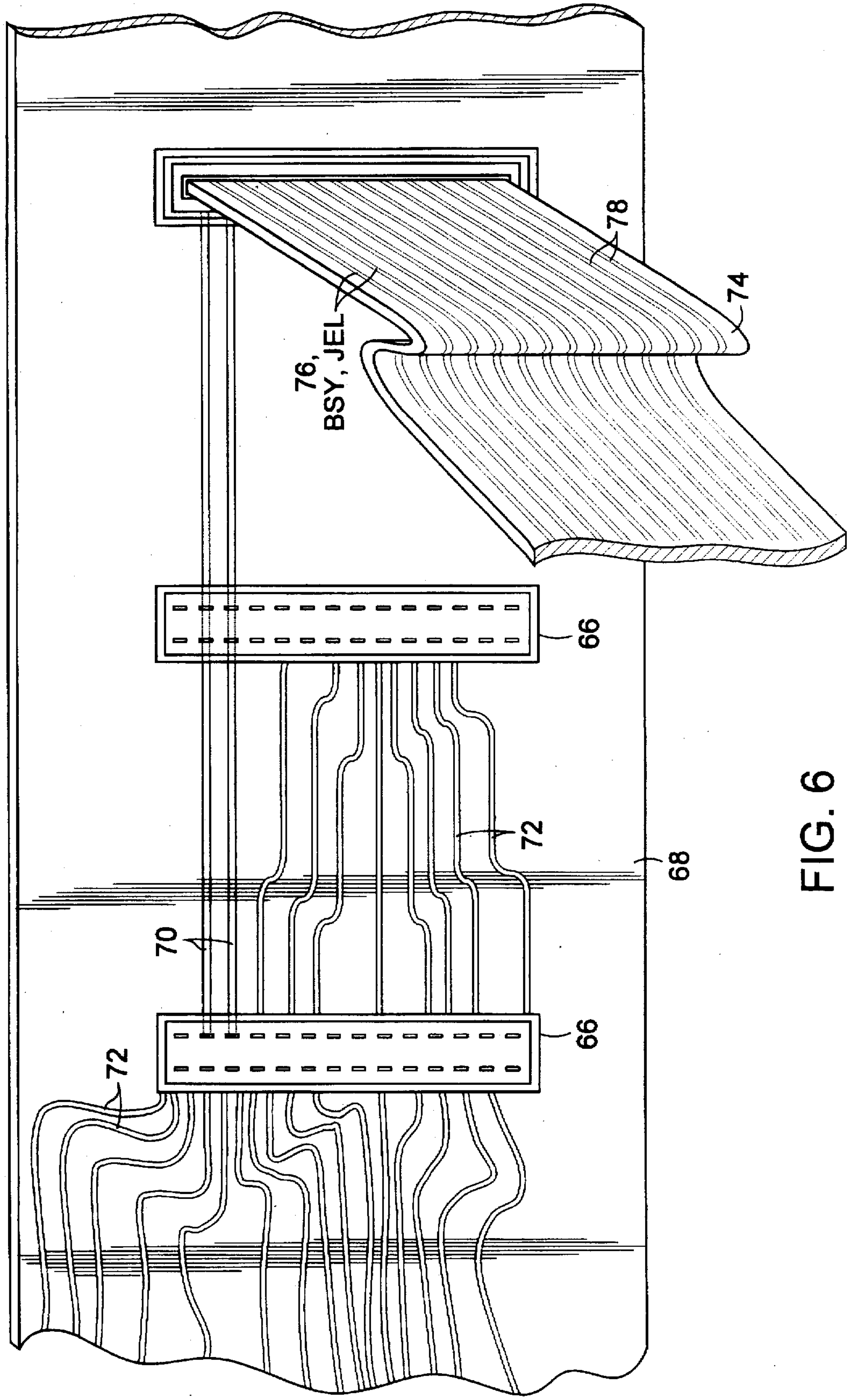
FIG. 6 is a representation of a SCSI bus backplane incorporating bus signal conductors according to the principles of the invention.

In FIG. 6, there are shown conductive paths 62 and 64 for routing the signals of a SCSI bus to device connectors 31*a* on a backplane 68; for example, a RAID (redundant array of inexpensive disks) system backplane. Here, there is shown a single-ended SCSI bus 14 routed between device connectors 31*a* on a backplane 68. The BSY and SEL signals subject to a wired-or glitch are routed via external wires 70 between the device connectors 31*a*. The other SCSI bus signals are routed between the connectors 31*a* via PCB etch 72, and may be many inches to even a foot or more long. Lengths of ribbon cable 74 may extend from each connector 31*a*, further increasing the length of the bus 14. The length of the conductive paths 62 carrying the BSY and SEL signals subject to the wired-or glitch include the lengths of the conductor pairs 76 within the ribbon cables 74 plus the lengths of the wires 70 connecting the signals between the device connectors 31*a*. As long as the total length of the conductive paths 62 carrying the BSY and SEL signals subject to the wired-or glitch remain within the SCSI cable length specification, the conductive paths 64 carrying the other bus signals, including etch 72 and the conductor pairs 78 within the ribbon cables 74, may exceed the 25 meter cable length limit.

A further bus length advantage can be obtained by combining the previously described ways of increasing cable length. If the wires 70 connecting the BSY and SEL signals between the connectors 31*a* in FIG. 6 are high propagation speed conductors 40 as shown in FIGS. 3, 4, or 5, the lengths of the conductive paths 62 transmitting the BSY and SEL signals may now also exceed the 25 meter SCSI cable length specification for the reasons previously described. The increased length will depend upon the proportionate length of the wires 70 to the conductive path 62 and the proportionate increase in propagation speed through, the wires 70. Alternately, both the wires 70 and the conductors 76 in the ribbon cables 74 can be implemented as high propagation speed conductors 40, providing an even greater increase in bus length.

A third way of increasing SCSI bus cable length applies a different principle to the wired-or glitch problem. The SCSI bus cable length is limited in the SCSI bus specification to allow a wired-or glitch on the BSY signal to settle to a voltage below the signal assertion voltage threshold of devices 12 on the bus so as to avoid bus contention due to "false" signal assertions. Thus, if the maximum voltage level of a BSY glitch can be maintained below the signal assertion voltage threshold of the devices 12—typically approximately 0.8 volts—then the bus settle time parameter, which currently limits the SCSI bus cable 30, is no longer the time in which a round trip propogation of a signal must occur, but is the time in which the signal must travel one length of the cable. The maximum cable 30 length is thereby effectively doubled.

Figure 7:
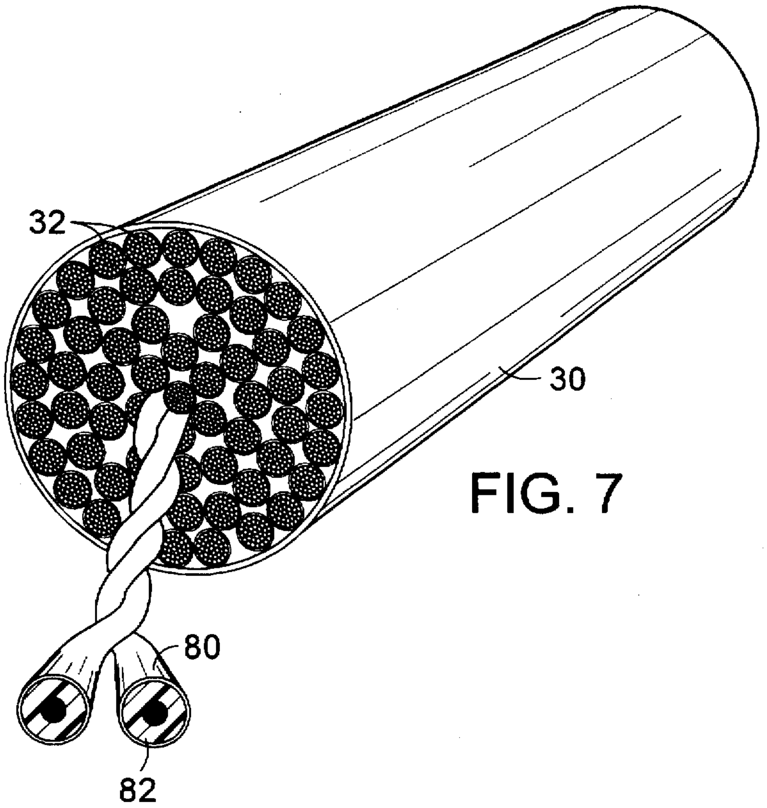
FIG. 7 is a cross-sectional view of a cable including conductors having a low characteristic impedance according to the principles of the invention.

Accordingly, referring to FIG. 7, there is provided a cable 30 for transmitting SCSI bus signals which includes amongst various conductors 32 particular conductors 80 having a low characteristic impedance for transmitting the signals subject to a wired-or glitch. The characteristic impedance of the conductors 80 is sufficiently low to ensure that a wired-or glitch resulting from a signal deassertion on the conductors 80 does not exceed a minimum threshold signal assertion voltage. In general, as the characteristic impedance of a conductor carrying a signal current I decreases, the signal voltage V decreases proportionately. Thus, given the magnitude of the switching current upon BSY signal deassertion, the maximum magnitude of a BSY glitch can be controlled by adjusting the characteristic impedance of the BSY signal conductor 80.

One way of providing a cable 30 including conductors 80 for transmitting the BSY signal having a relatively low characteristic impedance is by surrounding the BSY signal conductors 80 with a dielectric medium 82 having a relatively high dielectric constant. It is known that as the dielectric constant of material surrounding a conductor increases, the characteristic impedance of the conductor decreases. The medium 82 can be for example a metal-filled dielectric having a dielectric constant in the range of approximately 10–50. The propagation speed of the BSY signal will decrease as the dielectric constant of the surrounding medium 82 increases; however, as long as the maximum voltage level of the BSY glitch remains below 0.8 volts, the initial signal wavefront can take up to the specified bus settle time to travel the length of the cable 30 (half the round-trip time). The allowable cable length is thus at least doubled.

For systems implementing a wired-or SEL signal, the SEL conductors must also be transmitted via conductors 80 in the cable 30 having a relatively low characteristic impedance. According to this method of increasing SCSI bus cable length, only the BSY and SEL arbitration control signals should be transmitted via the low characteristic impedance conductors. Transmitting high speed bus signals such as the DATA signals via the low characteristic impedance conductors may adversely affect voltage levels and signal quality on these lines.

It is apparent that, within the scope of the invention, modifications and different arrangements may be made other than as herein disclosed. It is clear that the invention is not limited to SCSI bus applications, but can be useful in any application where cable lengths are presently limited due to the possibility of wired-or glitch on control signals; for example, the DSSI and HIPPI busses. The present disclosure is merely illustrative, the invention comprehending all variations thereof.

What is claimed is:

1. Apparatus for transmitting communications bus signals between devices, said communications bus signals including a control signal subject to a wired-or glitch, the apparatus comprising:

a cable comprising:

a first conductor for transmitting the control signal subject to said wired-or glitch, the first conductor having a first characteristic: impedance, the first characteristic impedance being sufficiently low to ensure that the wired-or glitch resulting from the deassertion of said control signal on said first conductor by one of said devices does not exceed a minimum threshold signal assertion voltage;

other conductors for transmitting the remaining communications bus signals, each of said other conductors having a second characteristic impedance higher than said first characteristic impedance; and connectors coupled to the cable, each said connector adapted for mating with a device connector on one of said devices, each said connector coupled to said first conductor and said other conductors for transfer of the communications bus signals between devices such that the control signal subject to the wired-or glitch is transmitted via the first conductor.

2. The apparatus of claim 1 wherein said first conductor is surrounded by a medium, the medium having a sufficiently high effective dielectric constant to provide said first conductor with said first characteristic impedance.

3. The apparatus of claim 2 wherein said communications bus signals comprise a SCSI bus, and wherein said control signal is the BSY control signal.

4. Apparatus for transmitting SCSI bus signals between devices, said SCSI bus signals including a BSY signal subject to a wired-or glitch, the apparatus comprising:

a cable comprising:

a first conductor for transmitting said BSY signal, the first conductor being surrounded by a medium having a sufficiently high effective dielectric constant to provide said first conductor with a first characteristic impedance sufficiently low to ensure that the wired-or glitch resulting from the deassertion of the BSY signal on said first conductor by one of said devices does not exceed a minimum threshold signal assertion voltage;

other conductors for transmitting the remaining SCSI bus signals, each of said other conductors having a second characteristic impedance higher than said first characteristic impedance; and SCSI connectors coupled to the cable, each SCSI connector adapted for mating with a device SCSI connector on one of said devices, each said SCSI connector coupled to said first conductor and said other conductors for transfer of the SCSI bus signals between the devices such that the BSY signal is transmitted via the first conductor.

5. An apparatus for transmitting communications bus signals between devices, said communications bus signals including control signals subject to a wired-or glitch, the apparatus comprising:

a cable comprising:

a first set of conductors for transmitting the control signals subject to said wired-or glitch, each of said conductors of said first set of conductors having a first characteristic impedance such that an arbitration control signal deassertion on any of the conductors of the first set of conductors by one of said devices does not exceed a minimum threshold signal assertion voltage;

a second set of conductors for transmitting the remaining communications bus signals, the conductors of said second set of conductors having a second characteristic impedance higher than said first characteristic impedance; and connectors coupled to the cable, each said connector adapted for mating with a device connector on one of said devices, each said connector coupled to said first and second sets of conductors for transfer of the communications bus signals between devices such that the control signals subject to the wired-or glitch are transmitted via the first set of conductors.

6. The apparatus of claim 5 wherein each of the conductors of said first set of conductors is surrounded by a medium, the medium having a sufficiently high effective dielectric constant to provide each of said conductors of said first set of conductors with said first characteristic impedance.

7. The apparatus of claim 6 wherein said communications bus signals comprise a SCSI bus, and wherein said control signals are the BSY and SEL control signals.

8. An apparatus for transmitting SCSI bus signals between devices, said SCSI bus signals including BSY and SEL control signals subject to a wired-or glitch, the apparatus comprising:

a cable comprising:

a first set of conductors for transmitting said BSY and SEL control signals, each of the conductors of the first set of conductors being surrounded by a medium having a sufficiently high effective dielectric constant to provide said conductors with a first characteristic impedance sufficiently low to ensure that the wired-or glitch resulting from the deassertion of the BSY or SEL signal on a conductor of said first set of conductors by one of said devices does not exceed a minimum threshold signal assertion voltage;

a second set of conductors for transmitting the remaining SCSI bus signals, each of said a second set of conductors having a second characteristic impedance higher than said first characteristic impedance; and SCSI connectors coupled to the cable, each said connector adapted for mating with a device connector on one of said devices, each said connector coupled to said first and second sets of conductors for transfer of the SCSI bus signals between devices such that the BSY and SEL control signals are transmitted via the first set of conductors.

* * * * *